United States Patent
Nakamura

(10) Patent No.: US 6,825,631 B1
(45) Date of Patent: Nov. 30, 2004

(54) PREDICTION CONTROLLING DEVICE

(75) Inventor: Hiroshi Nakamura, Fukuoka (JP)

(73) Assignee: Kabushiki Kaisha Yaskawa Denki, Kitakyushu (JP)

(*) Notice: Subject to any disclaimer, the term of this patent is extended or adjusted under 35 U.S.C. 154(b) by 38 days.

(21) Appl. No.: 10/343,954

(22) PCT Filed: Aug. 10, 2001

(86) PCT No.: PCT/JP01/06951
§ 371 (c)(1),
(2), (4) Date: Feb. 4, 2003

(87) PCT Pub. No.: WO02/17023
PCT Pub. Date: Feb. 28, 2002

(30) Foreign Application Priority Data

Aug. 18, 2000 (JP) .................................. 2000-248738

(51) Int. Cl.[7] .............................................. G05B 11/01
(52) U.S. Cl. ..................... 318/560; 318/565; 318/567; 318/568.17; 318/626; 700/28; 700/31; 700/41; 700/44; 700/45; 700/46
(58) Field of Search ................................. 318/560, 565, 318/567, 568.17, 626; 700/28, 31, 41, 44, 45, 46

(56) References Cited

U.S. PATENT DOCUMENTS

| | | | | |
|---|---|---|---|---|
| 4,358,822 A | * | 11/1982 | Sanchez ...................... | 700/31 |
| 4,663,703 A | * | 5/1987 | Axelby et al. ................ | 700/29 |
| 5,119,287 A | * | 6/1992 | Nakamura et al. ............ | 700/51 |
| 5,682,309 A | * | 10/1997 | Bartusiak et al. ............. | 700/29 |
| 5,726,878 A | * | 3/1998 | Nakamura et al. ............ | 700/44 |

* cited by examiner

Primary Examiner—Rina Duda
(74) Attorney, Agent, or Firm—Knobbe Martens Olson & Bear, LLP

(57) ABSTRACT

A controlling device of high follow-up accuracy is provided, the prediction accuracy of which is not degraded by an FF signal when the controlled object is feedforward-controlled. The prediction controlling device 1 has a feedforward signal generation command filter 2 for generating a future command increment which is an increment from one sampling period to the next sampling period of a target command signal from the present to a multiple-sampling future and the feedforward signal from the future target command signal. A prediction controller 3 receives the future command increment, the feedforward signal, and a controlled object output at the past sampling time over zero sampling, and determines the future error prediction value by using a transfer function model from the feedforward signal and the control input to the controlled object output.

6 Claims, 5 Drawing Sheets

PREDICTION CONTROLLING DEVICE

This application is the U.S. National Phase under 35 U.S.C. §371 of International Application PCT/JP01/06951, filed Aug. 10, 2001, which claims priority to Japanese Patent Application No. 2000-248738, filed Aug. 18, 2000. The International Application was published under PCT Article 21(2) in a language other than English.

TECHNICAL FIELD OF THE INVENTION

The present invention relates to a controlling device of a machine tool, and a robot, etc.

BACKGROUND OF THE INVENTION

In the prior arts, there is a device disclosed in the xi-th embodiment of International Unexamined Patent Publication No. WO93/20489, which is proposed by the present applicant, as this type of controlling device. FIG. 6 is a block diagram showing a configuration of a device according to the xi-th embodiment of the International Unexamined Patent Publication No. WO93/20489.

In FIG. 6, i indicates the present time, i+X (X is a positive integer) indicates a future time coming in X sampling from the present sampling time i at a sampling time Ts, and i−X indicates a past time elapsed by X sampling from the time i at a sampling time Ts. Also, r(Y) (Y is an integer) indicates a target command of time Y, y(Y) indicates an output from a controlled object (not illustrated) at time Y, and u(Y) indicates an input (hereinafter called "control input") to a controlled object (not illustrated) at time Y. A prior art controlling device 80 shown in FIG. 6 is a controlling device for reconciling the output of a controlled object (not illustrated) with a target command given.

Referring to FIG. 6, the controlling device 80 inputs a control input u(i) into a controlled object (not illustrated), so that an output y(i) from the object is reconciled with a target command r(i), using a future target command r(i+M) given and an output y(i−K) from the object as inputs. The controlling device 80 includes memories 81, 82, 83, 84, an operational unit 85, and a subtracter 86.

The memory 81 stores a target command from K sampling past to M sampling future, memory 82 stores controlling constants, memory 83 stores outputs from a controlled object from K+Na (Na is a natural number) sampling past to K sampling past, and memory 84 stores control inputs from K+Nb (Nb is a natural number) past to 1 sampling past. The subtracter 86 acquires an error between the target command r(i−K) and an output y(i−K) from the controlled object.

The operational unit 85 is a computing element for determining a control input u(i) as shown below, so that an performance function regarding both a future error prediction value obtained by using a transfer function model from a control input u(i) to an output y(i) of a controlled object and the control input become minimal:

$$u(i) = \sum_{m=1}^{M} q_m r(i+m) - \sum_{n=0}^{Na} p_n y(i-K-n) + Ee(i-K) - \sum_{n=1}^{Nb+K} g_n u(i-n)$$

According to the prior art controlling device 80, since the control input is determined so that the future error prediction value is minimized, control of high follow-up accuracy can be applied to the controlled object.

However, in the prior art controlling device 80 shown in FIG. 6, if any feedforward control is applied to the controlled object, the controlling device 80 predicts a future error with the feedforward signal (hereinafter called "FF signal") not taken into consideration, wherein a prediction error is produced in the future error prediction value, and resultantly there is a problem of worsening the follow-up accuracy.

DISCLOSURE OF THE INVENTION

It is therefore an object of the invention to provide a controlling device of high follow-up accuracy, the prediction accuracy of which does not deteriorate by an FF signal where feedforward control is applied to a controlled object.

In order to solve the above-described problem, a prediction controlling device according to the invention outputs a control input and feedforward signal to the controlled object, so that the output of the controlled object is reconciled with a target command, and the prediction controlling device has a feedforward signal generation command filter that receives a target command signal which is information of the future target command as an input and outputs a future command increment which is an increment from one sampling period to the next sampling period of a target command signal from the present sampling time to a multiple-sampling future and a feedforward signal from the future target command signal, and the prediction controlling device further has a prediction controller that receives the future command increment, the feedforward signal and a controlled object output at the past sampling time over zero sampling as inputs, acquires the future error prediction value by using a transfer function model from the feedforward signal and the control input to the controlled object output, determines the control input so that the performance function of the error prediction value and the control input becomes minimal, and applies the control input to the controlled object.

In operations in the prediction controller, since a future error prediction value is acquired by a transfer function model with the feedforward signal taken into consideration, and the control input is determined so that the performance function of the future prediction value and control input is minimized, the prediction accuracy is not degraded by adding the feedforward control thereto.

According to an embodiment of the invention, the above-described feedforward signal generation command filter receives the above-described target command signal at the present sampling time as an input and outputs the corresponding target command signal or increments between the respective sampling periods of signals obtained by sampling the corresponding target command signal as the above-described command increments.

According to the present embodiment of the invention, the above-described feedforward signal generation command filter calculates and outputs the above-described feedforward signals, which are:

$FF_1(i)=\text{Gain1}\cdot\Delta r(i+m1)$ $FF_2(i)=\text{Gain2}\cdot\{\Delta r(i+m2)-\Delta r(i+m2-1)\}$ where i is the present sampling time, Gain1 and Gain2 are constants, m1 and m2 are integers that meet $0\leq m1\leq m2$, $\Delta r(i+m1)$ is the above-described command increment of the m1 sampling future, and $FF_1(i)$ and $FF_2(i)$ are the feedforward signals.

According to the embodiment of the invention, the above-described controlled objects are a motor and its speed controller, the control input is a speed command, the controlled object output is a motor position, and the feedforward signals are a feedforward signal for speed control, and a feedforward signal for torque control.

According to the present embodiment of the invention, the above-described prediction controller includes: an integrator that receives the future command increment as an input and calculates the target command from the present sampling time to a multiple-sampling future; a memory section that stores constants for prediction control in advance and receives as inputs the target command calculated by the integrator, two feedforward signals, controlled object output, and control input, and stores the past target command, past feedforward signals, past controlled object output and past control input; a subtracter that subtracts the controlled object output from the past target command and acquires the past error; and an operational unit that receives as inputs the target command acquired by the above-described integrator, the past feedforward signals, the past controlled object output, the past control input and constants for prediction control, which are stored by the memory section, and the error obtained by the subtracter, obtains a future error prediction value by using a discrete-time transfer function model, which is:

$$Y(z)=\{(b_1 z^{-1}+ \ldots +b_{Nb} z^{-Nb})U(z)+(d_1 z^{-1}+ \ldots +d_{Nd} z^{-Nd})FF_1(z)+ (c_1 z^{-1}+ \ldots +c_{Nc} z^{-Nc})FF_2(z)\}/(1-a_1 z^{-1} 31 \ldots -a_{Na} z^{-Na}),$$

from the feedforward signal and the control input to the controlled object output where $FF_1(z)$ and $FF_2(z)$ are z-converted by the two feedforward signals, $U(z)$ is z-converted by the above control input, $Y(z)$ is z-converted by the controlled object output, Na, Nb, Nc, and Nd are natural numbers, and $a_1, a_2, \ldots, a_{Na}, b_1, b_2, \ldots, b_{Nb}, c_1, c_2, \ldots, c_{Nc}, d_1, d_2, \ldots, d_{Nd}$ are prescribed coefficients, and determines and outputs the control input so that the performance function of the corresponding future error prediction value and control input is minimized.

According to the embodiment of the invention, the above-described operational unit calculates and outputs the above-described control input, which is:

$$u(i) = \sum_{m=1}^{M} q_m r(i+m) - \sum_{n=0}^{Na} p_n y(i-K-n) + Ee(i-K) - \sum_{n=1}^{Nb+K} g_n u(i-n) - \sum_{n=0}^{Nd+K} x_n FF_1(i-n) - \sum_{n=0}^{Nc+K} t_n FF_2(i-n)$$

where x is an integer showing a sampling time, $FF_1(x)$ and $FF_2(x)$ are the two feedforward signals, $u(x)$ is the control input, $y(x)$ is the controlled object output, $r(x)$ is the target command, M, Na, Nb, Nc, and Nd are natural numbers, K is an integer of $K \geq 0$, qm, pn, E, gn, xn, and tn are said constants for the above-described prediction control, and i is the present sampling time.

According to another embodiment of the invention, the prediction controlling device includes: a first difference unit that receives the two feedforward signals as inputs and acquires increments of the respective sampling periods of the corresponding feedforward signals as feedforward signal increments; a second difference unit that receives the past controlled object output as an input and acquires increments of the respective sampling periods of the corresponding controlled object output as the past output increments; a memory section that stores constants for prediction control in advance, receives as inputs the command increments, two feedforward signal increments acquired by the first difference unit, output increment acquired by the second difference unit, control input, and increment of the control input, and stores the past command increment, past feedforward signal increments, past output increment, past control input, and past increment of the control input; a subtracter that subtracts the past output increment from the past command increment and acquires an increment of the past error; a first integrator that integrates the increment of the error acquired by the subtracter and acquires the above-described error; an operational unit that receives as inputs the future command increment, past command increment, past feedforward signal increments, past output increment, past control input, past increment of the control input, constants for the prediction control, which are stored by the memory section, and the error acquired by the first integrator, acquires a future error prediction value by using a discrete-time transfer function model from the feedforward signals and the control input to the controlled object output, which is:

$$Y(z)=\{(b_1 z^{-1}+ \ldots +b_{Nb} z^{-Nb})U(z)+(d_1 z^{-1}+ \ldots +d_{Nd} z^{-Nd})FF_1(z)+ (c_1 z^{-1}+ \ldots +c_{Nc} z^{-Nc})FF_2(z)\}/(1-a_1 z^{-1}- \ldots -a_{Na} z^{-Na})$$

where $FF_1(z)$ and $FF_2(z)$ are z-converted by the two feedforward signals, $U(z)$ is z-converted by the control input, $Y(z)$ is z-converted by the controlled object output, Na, Nb, Nc, and Nd are natural numbers, and $a_1, a_2, \ldots, a_{Na}, b_1, b_2, \ldots, b_{Nb}, c_1, c_2, \ldots, c_{Nc}, d_1, d_2, \ldots, d_{Nd}$ are prescribed coefficients, and determines and outputs the increment of the control input so that the performance function with respect to the corresponding future error prediction value and control input is minimized; and a second integrator that integrates the increment of the control input outputted by the above-described operational unit and acquires the control input.

According to the embodiment of the invention, the above-described operational unit calculates and outputs the increment of the control input, which is:

$$\Delta u(i) = \sum_{m=K+1}^{M} v_m \Delta r(i+m) - \sum_{n=0}^{Na-1} p_n \Delta y(i-K-n) + Ee(i-K) - \sum_{n=1}^{Nb+K-1} g_n \Delta u(i-n) - \sum_{n=0}^{Nd+K-1} x_n \Delta FF_1(i-n) - \sum_{n=0}^{Nc+K-1} t_n \Delta FF_2(i-n) - Fu(i-1)$$

where x is an integer showing a sampling time, $\Delta FF_1(x)$ and $\Delta FF_2(x)$ are increments of the two feedforward signals, $\Delta u(x)$ is an increment of the control input, $\Delta y(x)$ is the output increment, $\Delta r(x)$ is the command increment, $e(x)$ is the error, M, Na, Nb, Nc, and Nd are natural numbers, K is an integer of $K \geq 0$, vm, pn, E, gn, xn, tn and F are constants for the prediction control, and i is the present sampling time.

According to still another embodiment of the invention, the above-described prediction controller includes: a difference unit that receives the past controlled object output as an input and acquires increments of respective sampling periods of said corresponding controlled object output as the past output increments; a memory section that stores constants for prediction control in advance, receives as inputs the command increment, two feedforward signals, output increment obtained by said difference means, and control input, and stores said past command increment, said past feedforward signals, said past output increment, and said past control input; a subtracter that subtracts the past output increment from the past command increment, and acquires the past error increments; an integrator that integrates the increment of the error, which is obtained by said subtracter and acquires said error; and an operational unit that receives as inputs the future command increment, past command increment, past feedforward signal, past output increment, past control input, constants for the prediction control, which are stored by the memory section, and the error acquired by the integrator, acquires a future error prediction value by using a discrete-time transfer function model from the feedforward signals and the control input to the controlled object output, which is $$Y(z)=\{(b_1z^{-1}+\ldots+b_{Nb}z^{-Nb})U(z)+(d_1z^{-1}+\ldots+d_{Nd}z^{-Nd})FF_1(z)+(c_1z^{-1}+\ldots+c_{Nc}z^{-Nc})FF_2(z)\}/\{(1-z^{-1})(1-a_1z^{-1}-\ldots-a_{Na}z^{-Na})\}$$

where $FF_1(z)$ and $FF_2(z)$ are z-converted by the two feedforward signals, $U(z)$ is z-converted by the control input, $Y(z)$ is z-converted by the controlled object output, Na, Nb, Nc, and Nd are natural numbers, $a_1, a_2, \ldots, a_{Na}, b_1, b_2, \ldots, b_{Nb}, c_1, c_2, \ldots, c_{Nc}, d_1, d_2, \ldots, d_{Nd}$ are prescribed coefficients, and determines and outputs the control input so that the performance function with respect to the corresponding future error prediction value and control input is minimized.

According to the embodiment of the invention, the above-described operational unit calculates and outputs the above-described control input, which is:

$$u(i) = \sum_{m=-K+1}^{M} v_m \Delta r(i+m) - \sum_{n=0}^{Na-1} p_n \Delta y(i-K-n) + Ee(i-K) - \sum_{n=1}^{Nb+K-1} g_n u(i-n) - \sum_{n=0}^{Nd+K-1} x_n FF_1(i-n) - \sum_{n=0}^{Nc+K-1} t_n FF_2(i-n)$$

where x is an integer showing a sampling time, $FF_1(x)$ and $FF_2(x)$ are the two feedforward signals, $u(x)$ is the control input, $\Delta y(x)$ is the output increment, $\Delta r(x)$ is the command increment, $e(x)$ is the error, vm, pn, E, gn, xn, and tn are constants for the prediction control, and i is the present sampling time.

According to the invention, in the calculations of the prediction controller, a future error prediction value is acquired by a transfer function model in which the feedforward signals are taken into consideration, and the control input is determined so that the performance function with respect to the future prediction value and control input is minimized. Therefore, the prediction accuracy is not degraded by addition of the feedforward control, wherein control of high follow-up accuracy is enabled.

BEST MODE FOR CARRYING OUT THE INVENTION

Hereinafter, a detailed description is given of an embodiment of the invention with reference to the accompanying drawings.

Figure 1:
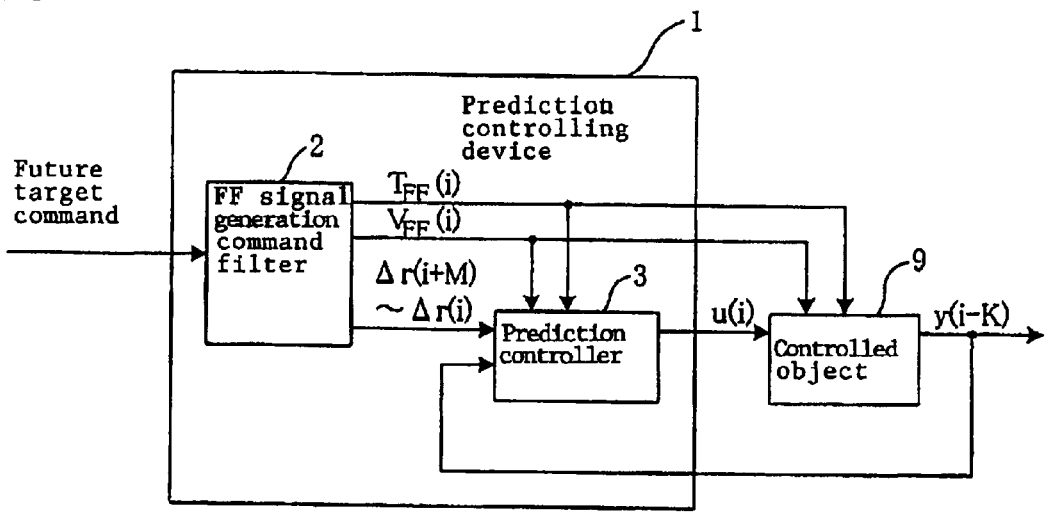
FIG. 1 is a block diagram showing a configuration of a prediction controlling device according to an embodiment of the invention.

FIG. 1 is a block diagram showing a configuration of a prediction controlling device according to an embodiment of the invention. Referring to FIG. 1, a prediction controlling device 1 according to the present embodiment outputs control input u(i) and FF signals to a controlled object, so that the output of the controlled object is reconciled with a target command, and includes an FF signal generation command filter 2 and a prediction controller 3.

Figure 7:
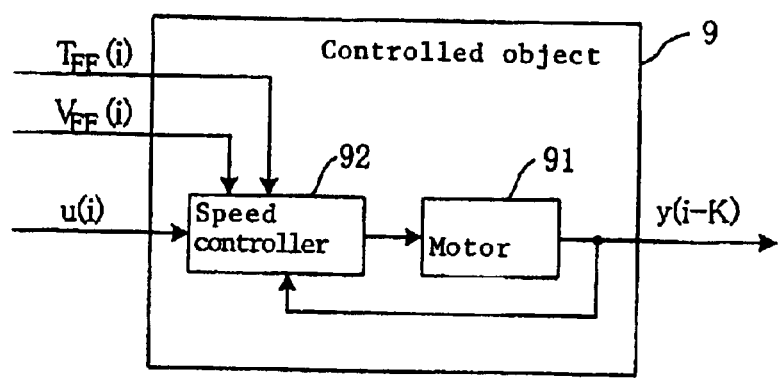
FIG. 7 is a block diagram showing a configuration of a controlled object according to the present embodiment.

In addition, as shown in FIG. 7, the controlled object 9 according to the embodiment is a motor 91 and its speed controller 92 as one example. However, the prediction controlling device 1 according to the embodiment is not limited to control of the motor and its speed controller. It can be used for other controlled objects for which feedforward control is carried out. For example, the prediction controlling device 1 can be used for a process control that controls temperature, humidity, pressure, flow rate, etc., in a chemical reaction process of a chemical plant.

Also, a control input u(i) is a speed command to the speed controller 92, an output y(i–K) of the controlled object 9 is a motor position of the motor 91 of the K (an integer of K≧0) sampling past, and FF signals include an FF signal $V_{FF}(i)$ for speed control and an FF signal $T_{FF}(i)$ for torque control.

The FF signal generation command filter 2 receives information regarding a future target command at the present sampling time i as an input and outputs command increment $\Delta r(i), \ldots, \Delta r(i+M)$ to an M sampling future (M is a natural number) and FF signals $V_{FF}(i)$ and $T_{FF}(i)$. Also, variables with Δ, etc., indicate an increment in one sampling period.

Figure 2:
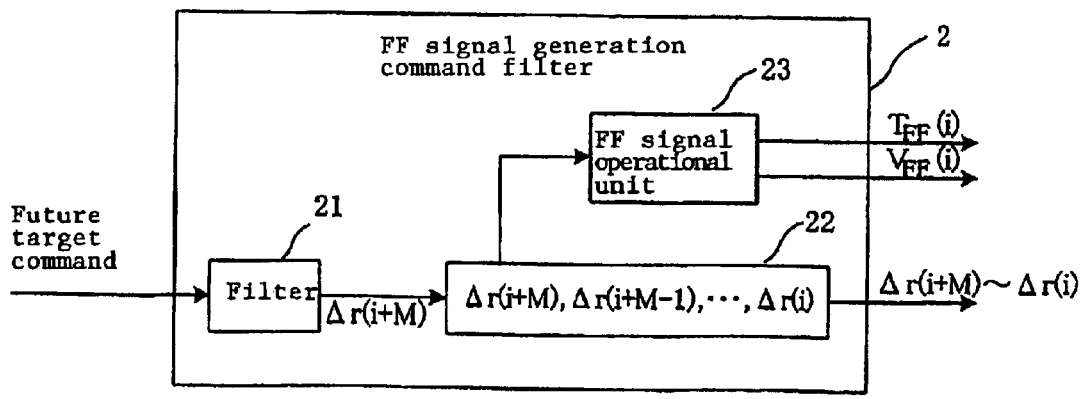
FIG. 2 is a block diagram showing a configuration of an FF signal generation command filter according to the embodiment.

FIG. 2 is a block diagram showing a configuration of an FF signal generation command filter according to the embodiment. Referring to FIG. 2, the FF signal generation command filter 2 includes a filter 21, a memory 22, and an FF signal operational unit 23. The filter 21 receives information regarding a future target command as an input, and outputs increments for respective sampling periods in an M sampling future of the inputted signal or a signal, which is obtained by filtering the inputted signal by an internal digital filter (not illustrated), as a command increment $\Delta r(i+M)$.

The digital filter may be any type of filter which can be used to filter the target command. For example, it may be an IIR filter whose impulse response is an infinite length or an FIR filter whose impulse response is a definite length. Further, the filter may be a low-pass filter, notch filter, or a filter for generating a signal to suppress vibrations of the controlled object output with dynamic characteristics of the controlled object taken into consideration.

The memory 22 stores command increments outputted from the filter 21 one after another and outputs command increments $\Delta r(i), \Delta r(i+1), \ldots, \Delta r(i+M)$ from the present time i to an M sampling future.

The FF signal operational unit 23 acquires and outputs FF signals $V_{FF}(i)$ and $T_{FF}(i)$ from the command increments outputted from the memory 22 $\Delta r(i), \Delta r(i+1), \ldots, \Delta r(i+M)$. An operational expression to acquire FF signals is not particularly limited. For example, it may deny an external disturbance given to the controlled object 9 if it is understood, or may be $$V_{FF}(i)=Gain1 \cdot \Delta r(i+m1)$$

$$T_{FF}(i)=Gain2 \cdot \{\Delta r(i+m2)-\Delta r(i+m2-1)\}$$

Herein, Gain1 and Gain 2 are multipliers. $\Delta r(i+m1)$ is a command increment of an m1 sampling time future. And, m1 and m2 are integers that meet $0 \leq m1 \leq m2$.

Figure 3:
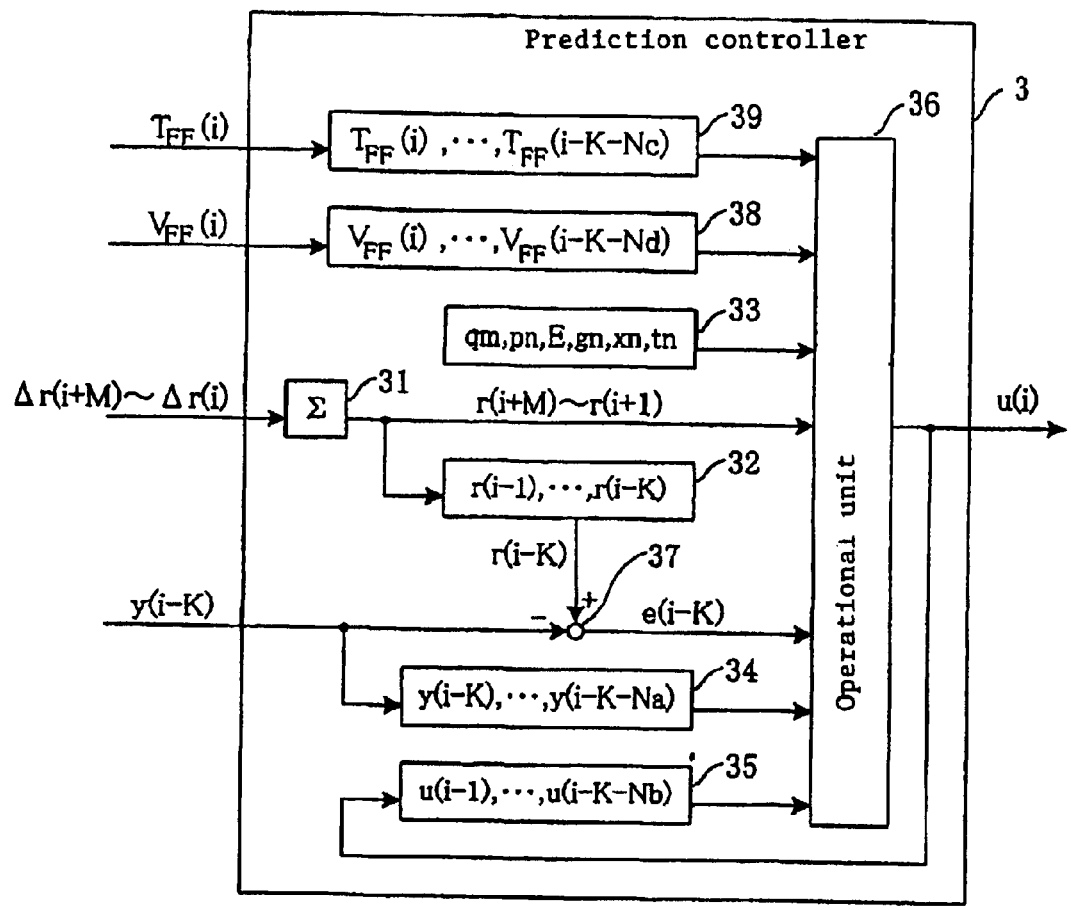
FIG. 3 is a block diagram showing a configuration of a prediction controller according to the embodiment.

FIG. 3 is a block diagram showing a configuration of the prediction controller 3 according to the present embodiment. The prediction controller 3 receives as inputs the FF signals $V_{FF}(i)$ and $T_{FF}(i)$, command increments $\Delta r(i), \Delta r(i+1), \ldots, \Delta r(i+M)$, and output $y(i-K)$ of the controlled object 9, acquires a future error prediction value by using a transfer function model from the FF signals and control input to the output, and determines and outputs the control input $u(i)$ so that the performance function with respect to the future error prediction value and control input $u(i)$ is minimized.

Referring to FIG. 3, the prediction controller 3 includes an integrator 31 and memories 32, 33, 34, 35, 38 and 39, a subtracter 37, and an operational unit 36. The integrator 31 acquires future commands values $r(i), r(i+1), \ldots, r(i+M)$ from the future command increments $\Delta r(i), \Delta r(i+1), \ldots, \Delta r(i+M)$. The memory 32 receives command values $r(i+1), r(i+2), \ldots, r(i+M)$ outputted from the integrator 31 as inputs, and stores command values $r(i-1), r(i-2), \ldots, r(i-K)$. The memory 33 stores constants for prediction control, which are qm (m=1, 2, ..., M), pn (n=0, 1, ..., Na), E, gn (n=1, 2, ..., Nb+K), xn (n=0, 1, ..., Nd+K), and tn (n=0, 1, ..., Nc+K). The memory 34 receives output $y(i-K)$ of the controlled object 9 and stores the past outputs $y(i-K), y(i-K-1), \ldots, y(i-K-Na)$. Also, Na is a natural number. The memory 35 receives control input $u(i)$ as an input and stores the past control inputs $u(i-1), u(i-2), \ldots, u(i-K-Nb)$. In addition, Nb is a natural number. The memory 38 receives an FF signal $V_{FF}(i)$ as an input and stores the past FF signals $V_{FF}(i), V_{FF}(i-1), \ldots, V_{FF}(i-K-Nd)$. Also, Nd is a natural number. The memory 39 receives an FF signal $T_{FF}(i)$ and stores the past FF signals $T_{FF}(i), T_{FF}(i-1), \ldots, T_{FF}(i-K-Nc)$. Also, Nc is a natural number. The subtracter 37 acquires an error $e(i-K)$ between the command value $r(i-K)$ stored in the memory 32 and the output $y(i-K)$ of the controlled object 9. The operational unit 36 calculates the control input $u(i)$ of the present time by calculations using Expression (1) and outputs it to the controlled object 9.

$$u(i) = \sum_{m=1}^{M} q_m r(i+m) - \sum_{n=0}^{Na} p_n y(i-K-n) + Ee(i-K) - \sum_{n=1}^{Nb+K} g_n u(i-n) - \sum_{n=0}^{Nd+K} x_n V_{FF}(i-n) - \sum_{n=0}^{Nc+K} t_n T_{FF}(i-n) \quad (1)$$

Since the prediction controlling device 1 according to the present embodiment includes memories 38 and 39 that store FF signals in the prediction controller 3 and the FF signals are taken into consideration in the calculations made by the operational unit 36, the prediction accuracy is not degraded by adding feedforward control thereto, and further since the FF signals are effectively utilized, the follow-up accuracy with respect to a target command is high.

Also, the prediction controlling device 1 according to the embodiment may use other configurations of a prediction controller instead of the prediction controller 3.

Figure 4:
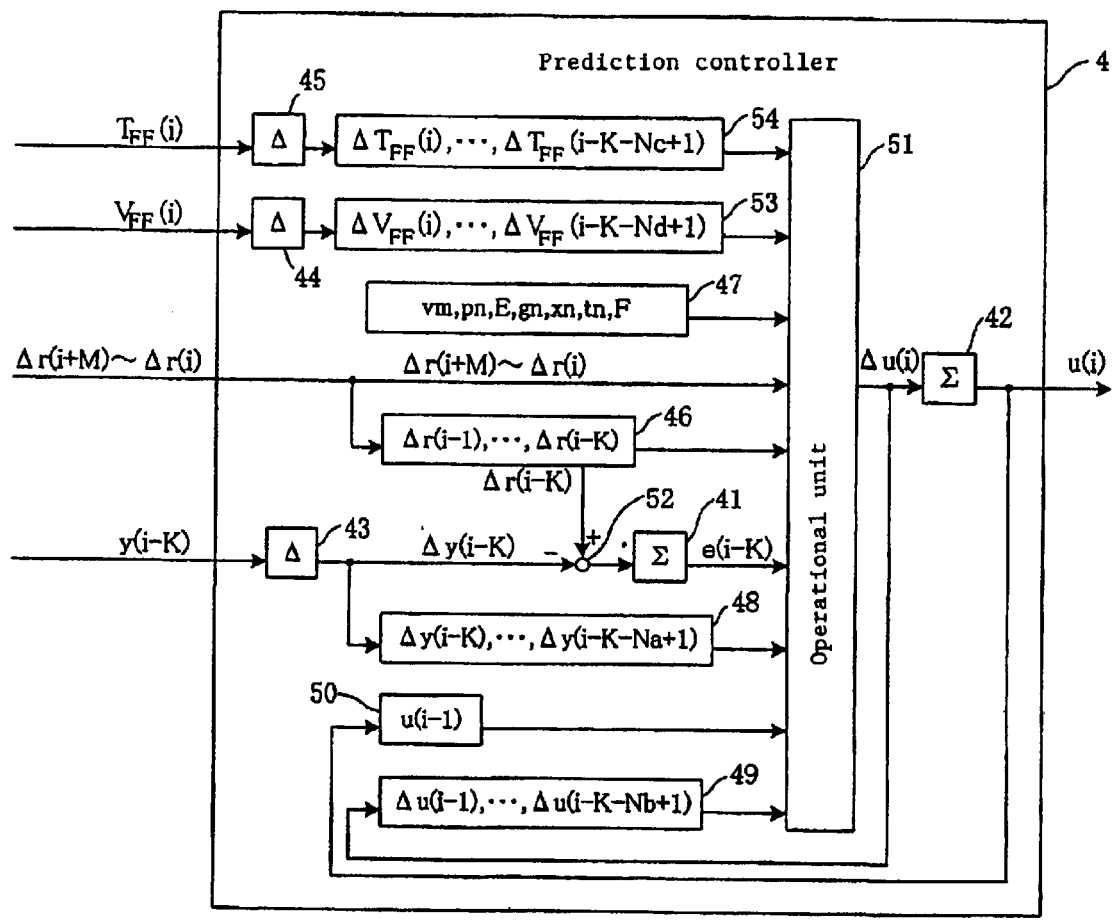
FIG. 4 is a block diagram showing a configuration of a prediction controller 4 according to another configuration of the prediction controlling device of the invention.

FIG. 4 is a block diagram showing the configuration of a prediction controller 4 of another configuration of the prediction controlling device 1 according to the invention. With reference to FIG. 4, the prediction controller 4 includes integrators 41, 42, difference units 43, 44, and 45, memories 46, 47, 48, 49, 50, 53, and 54, an operational unit 51, and a subtracter 52. The memory 46 receives future command increments $\Delta r(i), \Delta r(i+1), \ldots, \Delta r(i+M)$ as inputs, and stores command value increments $\Delta r(i-1), \Delta r(i-2), \ldots, \Delta r(i-K)$. The memory 47 stores constants vm (m=-K+1, -K+2, ..., M), pn (n=0, 1, ..., Na-1), E, gn (n=1, 2, ..., Nb+K-1), xn (n=0, 1, ..., Nd+K-1), tn (n=0, 1, ..., Nc+K-1), and F. The difference unit 43 receives output $y(i-K)$ of the controlled object 9, and acquires an output increment $\Delta y(i-K)$ between respective sampling periods. The memory 48 receives the increment $\Delta y(i-K)$ as an input and stores the past output increments $\Delta y(i-K-Na+1), \Delta y(i-K-Na+2), \ldots, \Delta y(i-K)$. The memory 49 receives an increment $\Delta u(i)$ of the control input, which is an output of the operational unit 51, as an input, and stores the increments $\Delta u(i-K-Nb+1), \Delta u(i-K-Nb+2), \ldots, \Delta u(i-1)$ of the past control input. The memory 50 receives a control input $u(i)$, which is an output of the integrator 42, as an input, and stores the past control input $u(i-1)$. The difference unit 44 receives the FF signal $V_{FF}(i)$ as an input, and acquires an increment $\Delta V_{FF}(i)$ between the sampling periods. The memory 53 receives an increment $\Delta V_{FF}(i)$ of the FF signal as an input, and stores the past increments $\Delta V_{FF}(i-K-Nd+1), \Delta V_{FF}(i-K-Nd+2), \ldots, \Delta V_{FF}(i)$. The difference unit 45 receives the FF signal $T_{FF}(i)$ as an input, and acquires the increment $\Delta T_{FF}(i)$ between the sampling periods. The memory 54 receives an increment $\Delta T_{FF}(i)$ of the FF signal as an input, and stores the past increments $\Delta T_{FF}(i-K-Nc+1), \Delta T_{FF}(i-K-Nc+2), \ldots, \Delta T_{FF}(i)$. The subtracter 52 acquires an error $\Delta e(i-K)$ between the command increment $\Delta r(i-K)$ stored by the memory 46 and the output increment $\Delta y(i-K)$ outputted by the difference unit 43. The integrator 41 integrates a difference value $\Delta e(i-K)$ and acquires an error $e(i-K)$. The operational unit 51 calculates the control input increment $\Delta u(i)$ of the present time by calculations of expression (2). The integrator 42 integrates the control input increment $\Delta u(i)$, acquires control input $u(i)$ and outputs it to the controlled object 9.

$$\Delta u(i) = \sum_{m=-K+1}^{M} v_m \Delta r(i+m) - \sum_{n=0}^{Na-1} p_n \Delta y(i-K-n) + Ee(i-K) - \sum_{n=1}^{Nb+K-1} g_n \Delta u(i-n) - \sum_{n=0}^{Nd+K-1} x_n \Delta V_{FF}(i-n) - \sum_{n=0}^{Nc+K-1} t_n \Delta T_{FF}(i-n) - Fu(i-1) \quad (2)$$

As in the case of the prediction controller 3, it is possible to obtain high prediction accuracy by the prediction controlling device 1 using the prediction controller 4.

Figure 5:
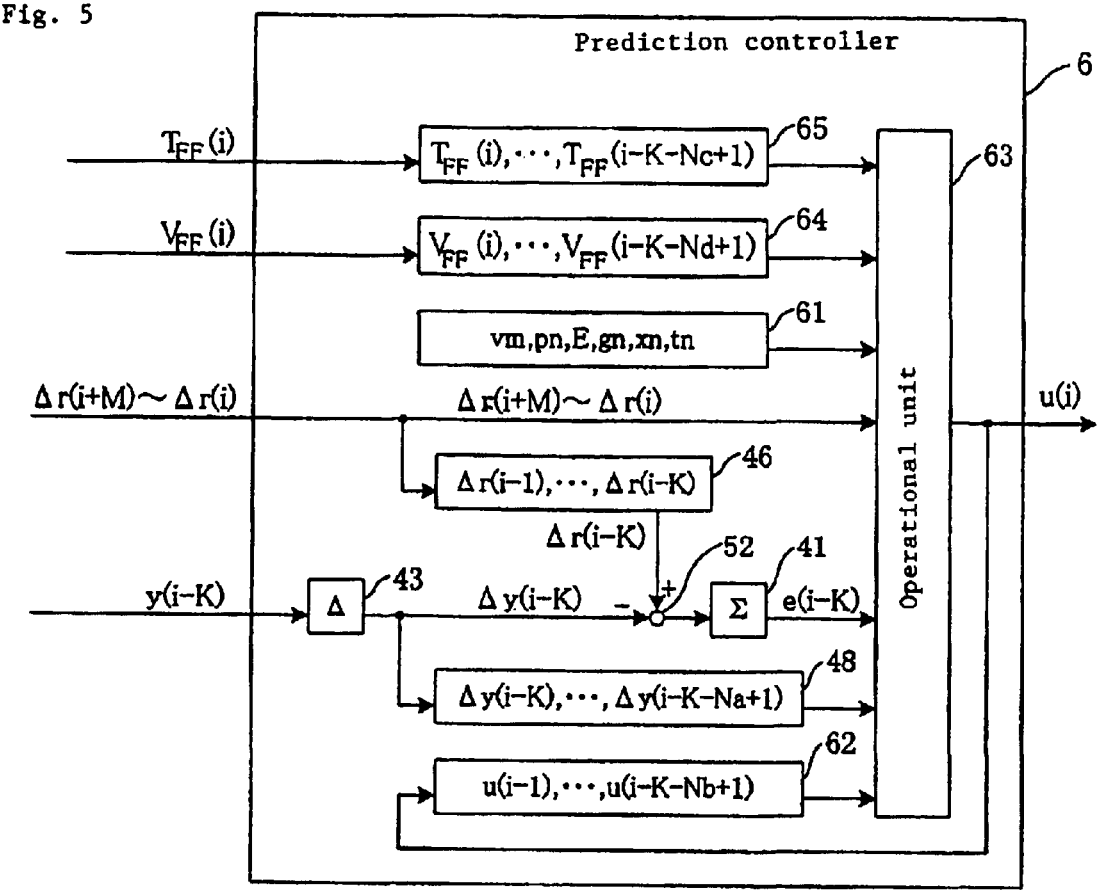
FIG. 5 is a block diagram showing a configuration of a prediction controller 6 according to still another configuration of the prediction controlling device of the invention.

FIG. 5 is a block diagram showing the configuration of a prediction controller 6 according to still another configuration of the prediction controlling device 1 of the invention. With reference to FIG. 5, the prediction controller 6 includes an integrator 41, a difference unit 43, memories 46, 61, 48, 62, 64, and 65, an operational unit 63, and a subtracter 52. The integrator 41, difference unit 43, memories 46 and 48, and subtracter 52 are the same as those in FIG. 4. The memory 61 stores constants vm (m=-K+1, -K+2, ..., M), pn (n=0, 1, ..., Na-1), E, gn (n=1, 2, ..., Nb+K-1), xn (n=0, 1, ..., Nd+K−1), and tn (n=0, 1, ..., Nc+K−1). The memory 62 receives a control input u(i), which is an output of the operational unit 63, as an input, and stores the past control inputs u(i−K−Nb+1), u(i−K−Nb+2), ..., u(i−1). The memory 64 receives an FF signal $V_{FF}(i)$ as an input and stores the past FF signals $V_{FF}(i-K-Nd+1)$, $V_{FF}(i-K-Nd+2)$, ..., $V_{FF}(i)$. The memory 65 receives an FF signal $T_{FF}(i)$ as an input and stores the past FF signals $T_{FF}(i-K-Nc+1)$, $T_{FF}(i-K-Nc+2)$, ..., $T_{FF}(i)$. The operational unit 63 calculates the control input u(i) of the present time by calculations of expression (3) and outputs it to the controlled object 9.

$$u(i) = \sum_{m=-K+1}^{M} v_m \Delta r(i+m) - \sum_{n=0}^{Na-1} p_n \Delta y(i-K-n) + Ee(i-K) - \sum_{n=1}^{Nb+K-1} g_n u(i-n) - \sum_{n=0}^{Nd+K-1} x_n V_{FF}(i-n) - \sum_{n=0}^{Nc+K-1} t_n T_{FF}(i-n) \quad (3)$$

As in the cases of the prediction controllers 3 and 4, it is possible to obtain high prediction accuracy by the prediction controlling device 1 using the prediction controller 6.

Next, a description is given of expressions (1) through (3) described above. First, expression (1) is derived. It is assumed that discrete-time transfer function model of the controlled object 9 from two FF signals $V_{FF}(i)$, $T_{FF}(i)$ and control input u(i) to output y(i) are obtained by:

$$Y(z) = \{(b_1 z^{-1} + \ldots + b_{Nb} z^{-Nb}) U(z) + (d_1 z^{-1} + \ldots + d_{Nd} z^{-Nd}) V_{FF}(z) + (c_1 z^{-1} + \ldots + c_{Nc} z^{-Nc}) T_{FF}(z)\} / (1 - a_1 z^{-1} - \ldots - a_{Na} z^{-Na}) \quad (4)$$

Here, Y(z), U(z), $V_{FF}(z)$, and $T_{FF}(z)$ are z-transform of y(i), u(i), $V_{FF}(i)$, and $T_{FF}(i)$. In this case, the input and output model becomes:

$$\hat{y}(i) = \sum_{n=1}^{Na} a_n \hat{y}(i-n) + \sum_{n=1}^{Nb} b_n u(i-n) + \sum_{n=1}^{Nd} d_n v_{FF}(i-n) + \sum_{n=1}^{Nc} c_n T_{FF}(i-n) \quad (5)$$

At time i, if the model estimate value, which is: $\hat{y}(i+m)$ (m=−K+1, −K+2, ...), of output after time i−K, is expressed in terms of an actually measured value y(i−n) (n=K, K+1, ...) since the following expressions (6a) and (6b) are established, $$\hat{y}(i-K+1) = \sum_{n=1}^{Na} a_n y(i-K+1-n) + \sum_{n=1}^{Nb} b_n u(i-K+1-n) + \sum_{n=1}^{Nd} d_n v_{FF}(i-K+1-n) + \sum_{n=1}^{Nc} c_n T_{FF}(i-K+1-n) \quad (6a)$$

$$m = -K+1$$

$$\hat{y}(i+m) = \sum_{n=1}^{m+K-1} a_n \hat{y}(i+m-n) + \sum_{n=m+K}^{Na} a_n y(i+m-n) + \sum_{n=1}^{Nb} b_n u(i+m-n) + \sum_{n=1}^{Nd} d_n v_{FF}(i+m-n) + \sum_{n=1}^{Nc} c_n T_{FF}(i+m-n) \quad (6b)$$

$$m = -K+2, -K+3, \ldots$$

it becomes:

$$\hat{y}(i+m) = \quad (7)$$

$$\sum_{n=K}^{Na+K-1} \hat{a}_{mn} y(i-n) + \sum_{n=0}^{Nb+K-1} \hat{b}_{mn} u(i-n) + \sum_{n=0}^{Nd+K-1} \hat{d}_{mn} v_{FF}(i-n) + \sum_{n=0}^{Nc+K-1} \hat{c}_{mn} T_{FF}(i-n) \quad m = -K+1, -K+2$$

Herein, where it is assumed that the future control input and feedforward signal are u(j)=u(i), $V_{FF}(j)=V_{FF}(i)$, $T_{FF}(j)=T_{FF}(i)$ (j=i+1, i+2, ...), the coefficients $\hat{a}_{mn}$, $\hat{b}_{mn}$, $\hat{d}_{mn}$, $\hat{c}_{mn}$ are given by:

$$\hat{a}_{(-K+1)n} = a_{n-K+1} \quad (8a)$$
$$m = -K+1 \quad n = K, K+1, \ldots, Na+K-1$$

$$\hat{a}_{mn} = \sum_{j=1}^{m+K-1} a_j \cdot \hat{a}_{(m-j)n} + a_{n+m} \quad (8b)$$
$$m = -K+2, -K+3, \ldots \quad n = K, K+1, \ldots, Na+K-1$$

$$\hat{b}_{(-K+1)n} = b_{n-K+1} \quad (9a)$$
$$m = -K+1 \quad n = 0, 1, \ldots, Nb+K-1$$

$$\hat{b}_{m0} = \sum_{j=1}^{m+K-1} a_j \cdot \hat{b}_{(m-j)0} + \sum_{j=1}^{m} b_j \quad (9b)$$
$$m = -K+2, -K+3, \ldots \quad n = 0$$

$$\hat{b}_{mn} = \sum_{j=1}^{m+K-1} a_j \cdot \hat{b}_{(m-j)n} + b_{n+m} \quad (9c)$$
$$m = -K+2, -K+3, \ldots \quad n = 1, 2, \ldots, Nb+K-1$$

$$\hat{d}_{(-K+1)n} = d_{n-K+1} \quad (10a)$$
$$m = -K+1 \quad n = 0, 1, \ldots, Nd+K-1$$

$$\hat{d}_{m0} = \sum_{j=1}^{m+K-1} a_j \cdot \hat{d}_{(m-j)0} + \sum_{j=1}^{m} d_j \quad (10b)$$
$$m = -K+2, -K+3, \ldots \quad n = 0$$

$$\hat{d}_{mn} = \sum_{j=1}^{m+K-1} a_j \cdot \hat{d}_{(m-j)n} + d_{n+m} \quad (10c)$$
$$m = -K+2, -K+3, \ldots \quad n = 1, 2, \ldots, Nd+K-1$$

$$\hat{c}_{(-K+1)n} = c_{n-K+1} \quad (11a)$$
$$m = -K+1 \quad n = 0, 1, \ldots, Nc+K-1$$

$$\hat{c}_{m0} = \sum_{j=1}^{m+K-1} a_j \cdot \hat{c}_{(m-j)0} + \sum_{j=1}^{m} c_j \quad (11b)$$
$$m = -K+2, -K+3, \ldots \quad n = 0$$

$$\hat{c}_{mn} = \sum_{j=1}^{m+K-1} a_j \cdot \hat{c}_{(m-j)n} + c_{n+m} \quad (11c)$$
$$m = -K+2, -K+3, \ldots \quad n = 1, 2, \ldots, Nc+K-1$$

Here, $a_n=0$ (n>Na), $b_n=0$ (n<1 and n>Nb), $d_n=0$ (n<1 and n>Nd), $c_n 0$ (n<1 and n>Nc). Therefore, if outputs after the time i−K are predicted by the following, $$y^*(i+m) = \hat{y}(i+m) + y(i-K) - \sum_{n=1}^{Na} a_n y(i-K-n) - \sum_{n=1}^{Nb} b_n u(i-K-n) - \sum_{n=1}^{Nd} d_n V_{FF}(i-K-n) - \sum_{n=1}^{Nc} c_n T_{FF}(i-K-n) \quad m = -K+1, \ldots \quad (12)$$

the output prediction value $y^*(i+m)$ is expressed as shown below;

$$y^*(i+m) = \sum_{n=K}^{Na+K} A_{mn} y(i-n) + \sum_{n=0}^{Nb+K} B_{mn} u(i-n) + \sum_{n=0}^{Nd+K} D_{mn} V_{FF}(i-n) + \sum_{n=0}^{Nc+K} C_{mn} T_{FF}(i-n) \quad m = -K+1, \ldots \quad (13)$$

the coefficients $A_{mn}$, $B_{mn}$, $D_{mn}$, and $C_{mn}$ become:

$A_{mK} = 1 + \hat{a}_{mK}$ $n=K$ $A_{mn} = \hat{a}_{mn} \cdot a_{n-K}$ $n=K+1, \ldots$ Na+K $B_{mn} = \hat{b}_{mn} \cdot b_{n-K}$ $n=0, 1, \ldots,$ Nb+K $D_{mn} = \hat{d}_{mn} \cdot d_{n-K}$ $n=0, 1, \ldots,$ Nd+K $C_{mn} = \hat{c}_{mn} \cdot c_{n-K}$ $n=0, 1, \ldots,$ Nc+K (14)

Here, $b_n = d_n = c_n = 0 (n<1)$, $\hat{a}_{m(Na+K)} = \hat{b}_{m(Nb+K)} = \hat{d}_{m(Nd+K)} = \hat{c}_{m(Nc+K)} = 0$ Therefore, if the future error prediction value $e^*(i+m)$ is given as $e^*(i+m) = r(i+m) - y^*(i+m) \quad m=1, 2 \ldots, M$ (15)

and the control input u(i) is determined so that the performance function of $$J = \sum_{m=1}^{M} w_m \{e^*(i+m) + \alpha e(i-K)\}^2 + c_a \{u(i)\}^2 + c_d \{\Delta u(i)\}^2 \quad (16)$$

is minimized, the expression (1) can be obtained by $\partial J/\partial u(i)=0$. The respective constants of qm, E, pn, gn, xn and tn are:

$$W = \sum_{j=1}^{M} w_j B_{j0}^2 + c_a + c_d \quad (17)$$

$q_m = w_m B_{m0}/W \quad m = 1, 2, \ldots, M$ $E = \alpha \sum_{m=1}^{M} q_m$

-continued $p_n = \sum_{m=1}^{M} q_m A_{m(n+K)} \quad n = 0, 1, \ldots, Na$ $g_1 = \sum_{m=1}^{M} q_m B_{m1} \cdot c_d/W,$ $g_n = \sum_{m=1}^{M} q_m B_{mn} \quad n = 2, \ldots, Nb+K$ $x_n = \sum_{m=1}^{M} q_m D_{mn} \quad n = 0, 1, \ldots, Nd+K$ $t_n = \sum_{m=1}^{M} q_m C_{mn} \quad n = 0, 1, \ldots, Nc+K$ According to the above, using a transfer function model (Expression (4)) in which the FF signals $V_{FF}(i)$ and $T_{FF}(i)$ are taken into consideration, it is possible to give the controlled object 9 a control input u(i) so that the performance function J (Expression (16)) is minimized, wherein it becomes possible to control with high follow-up accuracy, by which the prediction accuracy is not degraded by feedforward control.

Next, Expression (2) is derived. Using a discrete-time transfer function model of the controlled object from two FF signals $V_{FF}(i)$, $T_{FF}(i)$ and the control input u(i) to output y(i), which is:

$$Y(z) = \{(b_1 z^{-1} + \ldots + b_{Nb} z^{-Nb})U(z) + (d_1 z^{-1} + \ldots + d_{Nd} z^{-Nd})V_{FF}(z) + (c_1 z^{-1} + \ldots + c_{Nc} z^{-Nc})T_{FF}(z)\}/(1 - a_1 z^{-1} - \ldots - a_{Na} z^{-Na}) \quad (18)$$

at the time (i), the output increment after the time i−K is predicted by:

$$\Delta y^*(i-K+1) = \sum_{n=1}^{Na} a_n \Delta y(i-K+1-n) + \sum_{n=1}^{Nb} b_n \Delta u(i-K+1-n) + \sum_{n=1}^{Nd} d_n \Delta V_{FF}(i-K+1-n) + \sum_{n=1}^{Nc} c_n \Delta T_{FF}(i-K+1-n) \quad m = -K+1 \quad (19a)$$

$$\Delta y^*(i+m) = \sum_{n=1}^{m+K-1} a_n \Delta y^*(i+m-n) + \sum_{n=m+K}^{Na} a_n \Delta y(i+m-n) + \sum_{n=1}^{Nb} b_n \Delta u(i+m-n) + \sum_{n=1}^{Nd} d_n \Delta V_{FF}(i+m-n) + \sum_{n=1}^{Nc} c_n \Delta T_{FF}(i+m-n) \quad m = -K+2, -K+3, \ldots \quad (19b)$$

the output increment prediction value $\Delta y^*(i+m)$ becomes $$\Delta y^*(i+m) = \sum_{n=K}^{Na+K-1} A_{mn} \Delta y(i-n) + \sum_{n=0}^{Nb+K-1} B_{mn} \Delta u(i-n) + \sum_{n=0}^{Nd+K-1} D_{mn} \Delta V_{FF}(i-n) + \sum_{n=0}^{Nc+K-1} C_{mn} \Delta T_{FF}(i-n) \quad (20)$$

$m = -K+1, -K+2, \ldots$

Herein, where it is assumed that a future control input and feedforward signal increment are $\Delta u(j)=\Delta V_{FF}(j)=\Delta T_{FF}(j)=0$ (j=i+1, i+2, . . . ), the coefficients $A_{mn}$, $B_{mn}$, $D_{mn}$, and $C_{mn}$ become:

$$A_{(-K+1)n} = a_{n-K+1} \quad (21a)$$
$$m = -K+1 \quad n = K, K+1, \ldots, Na+K-1$$

$$A_{mn} = \sum_{j=1}^{m+K-1} a_j * A_{(m-j)n} + a_{n+m} \quad (21b)$$
$$m = -K+2, -K+3, \ldots n = K, K+1, \ldots, Na+K-1$$

$$B_{(-K+1)n} = b_{n-K+1} \quad (22a)$$
$$m = -K+1 \quad n = 0, 1, \ldots, Nb+K-1$$

$$B_{mn} = \sum_{j=1}^{m+K-1} a_j * B_{(m-j)n} + b_{n+m} \quad (22b)$$
$$m = -K+2, -K+3, \ldots n = 0, 1, \ldots, Nb+K-1$$

$$D_{(-K+1)n} = d_{n-K+1} \quad (23a)$$
$$m = -K+1 \quad n = 0, 1, \ldots, Nd+K-1$$

$$D_{mn} = \sum_{j=1}^{m+K-1} a_j * D_{(m-j)n} + d_{n+m} \quad (23b)$$
$$m = -K+2, -K+3, \ldots n = 0, 1, \ldots, Nd+K-1$$

$$C_{(-K+1)n} = c_{n-K+1} \quad (24a)$$
$$m = -K+1 \quad n = 0, 1, \ldots, Nc+K-1$$

$$C_{mn} = \sum_{j=1}^{m+K-1} a_j * C_{(m-j)n} + c_{n+m} \quad (24b)$$
$$m = -K+2, -K+3, \ldots n = 0, 1, \ldots, Nc+K-1$$

Here, $a_n=0$ (n>Na), $b_n=0$ (n<1 and n>Nb), $d_n=0$ (n<1 and n>Nd), $c_n=0$ (n<1 and n>Nc). Therefore, if the future error prediction value $e^*(i+m)$ is given as:

$$e^*(i+m) = \sum_{s=-K+1}^{m} \{\Delta r(i+s) - \Delta y^*(i+s)\} + e(i-K) \quad (25)$$
$$m = 1, 2, \ldots, M$$

and the control input increment $\Delta u(i)$ is determined so that the performance function, which is:

$$J = \sum_{m=1}^{M} W_m \{e^*(i+m) + \alpha e(i-K)\}^2 + c_a \{u(i)\}^2 + c_d \{\Delta u(i)\}^2 \quad (26)$$

is minimized, Expression (2) can be obtained by a $\partial J/\partial \Delta u(i)=0$. The respective constants vm, E, pn, gn, F, xn, and tn become:

$$\beta_s = \sum_{j=1}^{g} B_{j0}, \quad W = \sum_{s=1}^{M} w_g \beta_s^2 + c_a + c_d, \quad q_s = w_s \beta_s / W \quad (27)$$

$$v_m = \sum_{s=m}^{M} q_s \quad m = -K+1, -K+2, \ldots, M$$

$$E = (1+\alpha)v_1$$

-continued $$p_n = \sum_{m=-K+1}^{M} v_m A_{m(n+K)} \quad n = 0, 1, \ldots, Na-1$$

$$g_n = \sum_{m=-K+1}^{M} v_m B_{mn} \quad n = 1, 2, \ldots, Nb+K-1 \quad F = c_a/W$$

$$x_n = \sum_{m=-K+1}^{M} v_m D_{mn} \quad n = 0, 1, \ldots, Nd+K-1$$

$$t_n = \sum_{m=-K+1}^{M} v_m C_{mn} \quad n = 0, 1, \ldots, Nc+K-1$$

According to the above, using the transfer function model (Expression (18)) in which FF signals $V_{FF}(i)$ and $T_{FF}(i)$ are taken into consideration, it is possible to give the controlled object 9 a control input u(i) so that the performance function J (Expression (26)) is minimized, and control of high follow-up accuracy can be secured, in which the prediction accuracy cannot be degraded by the feedforward control.

Next, Expression (3) is derived. In the case where discrete-time transfer function model of the controlled object from two FF signals $V_{FF}(i)$, $T_{FF}(i)$ and control input u(i) to output y(i) are obtained by:

$$Y(z) = \{(b_1 z^{-1} + \ldots + b_{Nb} z^{-Nb})U(z) + (d_1 z^{-1} + \ldots + d_{Nd} z^{-Nd})V_{FF}(z) + (c_1 z^{-1} + \ldots + c_{Nc} z^{-Nc})T_{FF}(z)\}/\{(1-z^{-1})(1-a_1 z^{-1} - \ldots - a_{Na} z^{-Na})\} \quad (28),$$

if, at the time i, the output increment after the time i–K is predicted by:

$$\Delta y^*(i-K+1) = \sum_{n=1}^{Na} a_n \Delta y(i-K+1-n) + \quad (29a)$$
$$\sum_{n=1}^{Nb} b_n u(i-K+1-n) + \sum_{n=1}^{Nd} d_n V_{FF}(i-K+1-n) +$$
$$\sum_{n=1}^{Nc} c_n T_{FF}(i-K+1-n) \quad m = -K+1$$

$$\Delta y^*(i+m) = \sum_{n=1}^{m+K-1} a_n \Delta y^*(i+m-n) + \sum_{n=m+K}^{Na} a_n \Delta y(i+m-n) + \quad (29b)$$
$$\sum_{n=1}^{Nb} b_n u(i+m-n) + \sum_{n=1}^{Nd} d_n V_{FF}(i+m-n) +$$
$$\sum_{n=1}^{Nc} c_n T_{FF}(i+m-n) \quad m = -K+2, -K+3, \ldots$$

the output increment prediction value $\Delta y^*(i+m)$ becomes:

$$\Delta y^*(i+m) = \sum_{n=K}^{Na+K-1} A_{mn} \Delta y(i-n) + \sum_{n=0}^{Nb+K-1} B_{mn} u(i-n) + \quad (30)$$
$$\sum_{n=0}^{Nd+K-1} D_{mn} V_{FF}(i-n) + \sum_{n=0}^{Nc+K-1} C_{mn} T_{FF}(i-n)$$

$$m = -K+1, -K+2, \ldots$$

Herein, where it is assumed that the future control input and feedforward signal are u(j)=u(i), $V_{FF}(j)=V_{FF}(i)$, $T_{FF}(j)=T_{FF}(i)$ (j=i+1, i+2, ...), the coefficients $A_{mn}$, $B_{mn}$, $D_{mn}$, and $C_{mn}$, are given by:

$$A_{(-K+1)n} = a_{n-K+1} \quad (31a)$$
$$m = -K+1 \quad n = K, K+1, \ldots, Na+K-1$$

$$A_{mn} = \sum_{j=1}^{m+K-1} a_j * A_{(m-j)n} + a_{n+m} \quad (31b)$$
$$m = -K+2, -K+3, \ldots n = K, K+1, \ldots, Na+K-1$$

$$B_{(-K+1)n} = b_{n-K+1} \quad (32a)$$
$$m = -K+1 \quad n = 0, 1, \ldots, Nb+K-1$$

$$B_{m0} = \sum_{j=1}^{m+K-1} a_j * B_{(m-j)0} + \sum_{j=1}^{m} b_j \quad (32b)$$
$$m = -K+2, -K+3, \ldots n = 0$$

$$B_{mn} = \sum_{j=1}^{m+K-1} a_j * B_{(m-j)n} + b_{n+m} \quad (32c)$$
$$m = -K+2, -K+3, \ldots n = 1, 2, \ldots, Nb+K-1$$

$$D_{(-K+1)n} = d_{n-K+1} \quad (33a)$$
$$m = -K+1 \quad n = 0, 1, \ldots, Nd+K-1$$

$$D_{m0} = \sum_{j=1}^{m+K-1} a_j * D_{(m-j)0} + \sum_{j=1}^{m} d_j \quad (33b)$$
$$m = -K+2, -K+3, \ldots n = 0$$

$$D_{mn} = \sum_{j=1}^{m+K-1} a_j * D_{(m-j)n} + d_{n+m} \quad (33c)$$
$$m = -K+2, -K+3, \ldots n = 1, 2, \ldots, Nd+K-1$$

$$C_{(-K+1)n} = c_{n-K+1} \quad (34a)$$
$$m = -K+1 \quad n = 0, 1, \ldots, Nc+K-1$$

$$C_{m0} = \sum_{j=1}^{m+K-1} a_j * C_{(m-j)0} + \sum_{j=1}^{m} c_j \quad (34b)$$
$$m = -K+2, -K+3, \ldots n = 0$$

$$C_{mn} = \sum_{j=1}^{m+K-1} a_j * C_{(m-j)n} + c_{n+m} \quad (34c)$$
$$m = -K+2, -K+3, \ldots n = 1, 2, \ldots, Nc+K-1$$

Here, $a_n=0$ (n>Na), $b_n=0$ (n<1 and n>Nb), $d_n=0$ (n<1 and n>Nd), $c_n=0$ (n<1 and n>Nc). The future error prediction value $e^*(i+m)$ is given by:

$$e^*(i+m) = \sum_{s=-K+1}^{m} \{\Delta r(i+s) - \Delta y^*(i+s)\} + e(i-K) \quad (35)$$
$$m = 1, 2, \ldots, M$$

and the control input u(i) is determined so that the performance function of $$J = \sum_{m=1}^{M} W_m \{e^*(i+m) + \alpha e(i-K)\}^2 + c_a \{u(i)\}^2 + c_d \{\Delta u(i)\}^2 \quad (36)$$

is minimized, then, Expression (3) can be obtained by Expression $\partial J/\partial u(i)=0$. The respective constants vm, E, pn, gn, xn, and tn are as follows;

$$\beta_s \sum_{j=1}^{s} B_{j0}, \quad W = \sum_{s=1}^{M} w_s \beta_s^2 + c_s + c_d, \quad q_s = w_s \beta_s / W \quad (37)$$

$$v_m \sum_{s=m}^{M} q_s$$
$$m = -K+1, -K+2, \ldots, M$$

$$E = (1+\alpha)v_1$$

$$p_n = \sum_{m=-K+1}^{M} v_m A_{m(n+K)}$$
$$n = 0, 1, \ldots, Na-1$$

$$g_1 = \sum_{m=-K+1}^{M} v_m B_{m1} - c_d/W \quad g_n = \sum_{m=-K+1}^{M} v_m B_{mn}$$
$$n = 2, \ldots, Nb+K-1$$

$$x_n = \sum_{m=-K+1}^{M} v_m D_{mn}$$
$$n = 0, 1, \ldots, Nd+K-1$$

$$t_n = \sum_{m=-K+1}^{M} v_m C_{mn}$$
$$n = 0, 1, \ldots, Nc+K-1$$

According to the above, using the transfer function model (Expression (28)) in which FF signals $V_{FF}(i)$ and $T_{FF}(i)$ are taken into consideration, it is possible to give the controlled object 9 a control input u(i) so that the performance function J (Expression (36)) is minimized, and control of high follow-up accuracy can be secured, in which the prediction accuracy cannot be degraded by the feedforward control.

INDUSTRIAL APPLICABILITY

According to the invention, in calculations of a prediction controller, a future error prediction value is obtained by a transfer function model in which feedforward signals are taken into consideration, and a control input is determined so that the performance function regarding the future prediction value and control input is minimized. Therefore, the prediction accuracy is not degraded by addition of the feedforward control, wherein control of high follow-up accuracy is enabled.

What is claimed is:

1. A prediction controlling device outputting a control input and feedforward signal to the controlled object, so that the output of the controlled object is reconciled with a target command, comprising:

a feedforward signal generation command filter that receives a target command signal which is information of a future target command as an input and outputs a future command increment which is an increment from one sampling period to the next sampling period of a target command signal from the present sampling time to a multiple-sampling future and the feedforward signal from the future target command signal; and a prediction controller that receives the future command increment, the feedforward signal and a controlled object output at the past sampling time over zero sampling as inputs, acquires the future error prediction value by using a transfer function model from the feedforward signal and the control input to the controlled object output, determines the control input so that the performance function of the error prediction value and the control input becomes minimal, and applies the control input to the controlled object; and wherein said prediction controller includes: an integrator that receives the future command increment as an input and calculates said target command from the present sampling time to a multiple-sampling future;

a memory section that stores constants for prediction control in advance and receives as inputs said target command calculated by said integrator, two feedforward signals, controlled object output, and control input, and stores the past target command, past feedforward signals, past controlled object output and past control input;

a subtracter that subtracts said controlled object output from said past target command and acquires the past error; and an operational unit that receives as inputs the target command acquired by said integrator, the past feedforward signals, the past controlled object output, the past control input and constants for prediction control, which are stored by the memory section, and the error obtained by the subtracter, obtains a future error prediction value by using a discrete-time transfer function model, which is:

$$Y(z) = \{(b_1 z^{-1} + \ldots + b_{Nb} z^{-Nb})U(z) + (d_1 z^{-1} + \ldots + d_{Nd} z^{-Nd})FF_1(z) + (c_1 z^{-1} + \ldots + c_{Nc} z^{-Nc})FF_2(z)\} / (1 - a_1 z^{-1} - \ldots - a_{Na} z^{-Na}),$$

from the feedforward signal and the control input to the controlled object output where $FF_1(z)$ and $FF_2(z)$ are z-transform of the two feedforward signals, $U(z)$ is z-transform of the above control input, $Y(z)$ is z-transform of the controlled object output, Na, Nb, Nc, and Nd are natural numbers, and $a_1, a_2, \ldots, a_{Na}, b_1, b_2, \ldots, b_{Nb}, c_1, c_2, \ldots, c_{Nc}, d_1, d_2, \ldots, d_{Nd}$ are prescribed coefficients, and determines and outputs the control input so that the performance function of said corresponding future error prediction value and control input is minimized; and further wherein, where x is an integer indicating a sampling time, $FF_1(x)$ and $FF_2(x)$ are said two feedforward signals, $u(x)$ is said control input, $y(x)$ is said controlled object output, $r(x)$ is said target command, M, Na, Nb, Nc, and Nd are natural numbers, K is an integer of K≧0, qm, pn, E, gn, xn, and tn are said constants for prediction control, and i is the present sampling time, said operational unit calculates said control input, which is:

$$u(i) = \sum_{m=1}^{M} q_m r(i+m) - \sum_{n=0}^{Na} p_n y(i-K-n) + Ee(i-K) - \sum_{n=1}^{Nb+K} g_n u(i-n) - \sum_{n=0}^{Nd+K} x_n FF_1(i-n) - \sum_{n=0}^{Nc+K} t_n FF_2(i-n)$$

and outputs the same.

2. A prediction controlling device outputting a control input and feedforward signal to the controlled object, so that the output of the controlled object is reconciled with a target command, comprising:

a feedforward signal generation command filter that receives a target command signal which is information of the future target command as an input and outputs a future command increment which is an increment from one sampling period to the next sampling period of a target command signal from the present sampling time to a multiple-sampling future and the feedforward signal from the future target command signal; and a prediction controller that receives the future command increment, the feedforward signal and a controlled object output at the past sampling time over zero sampling as inputs, acquires the future error prediction value by using a transfer function model from the feedforward signal and the control input to the controlled object output, determines the control input so that the performance function of the error prediction value and the control input becomes minimal, and applies the control input to the controlled object; and wherein said prediction controller includes:

a first difference unit that receives said two feedforward signals as inputs and acquires increments of the respective sampling periods of the corresponding feedforward signals as feedforward signal increments;

a second difference unit that receives the past controlled object output as an input and acquires increments of the respective sampling periods of the corresponding controlled object output as the past output increments;

a memory section that stores constants for prediction control in advance, receives as inputs the command increments, two feedforward signal increments acquired by the first difference unit, output increment acquired by the second difference unit, control input, and increment of the control input, and stores the past command increment, past feedforward signal increments, past output increment, past control input, and past increment of the control input;

a subtracter that subtracts the past output increment from the past command increment and acquires an increment of the past error;

a first integrator that integrates the increment of the error acquired by the subtracter and acquires said error;

an operational unit that receives as inputs the future command increment, past command increment, past feedforward signal increments, past output increment, past control input, past increment of the control input, constants for the prediction control, which are stored by the memory means, and the error acquired by the first integrator, acquires a future error prediction value by using a discrete-time transfer function model from the feedforward signals and the control input to the controlled object output, which is:

$$Y(z) = \{(b_1 z^{-1} + \ldots + b_{Nb} z^{-Nb})U(z) + (d_1 z^{-1} + \ldots + d_{Nd} z^{-Nd})FF_1(z) + (c_1 z^{-1} + \ldots + c_{Nc} z^{-Nc})FF_2(z)\} / (1 - a_1 z^{-1} - \ldots - a_{Na} z^{-Na})$$

where $FF_1(z)$ and $FF_2(z)$ are z-transform of the two feedforward signals, $U(z)$ is z-transform of the control input, $Y(z)$ is z-transform of the controlled object output, Na, Nb, Nc, and Nd are natural numbers, and $a_1, a_2, \ldots, a_{Na}, b_1, b_2, \ldots, b_{Nb}, c_1, c_2, \ldots, c_{Nc}, d_1, d_2, \ldots, d_{Nd}$ are prescribed coefficients, and determines and outputs the increment of the control input so that the performance function with respect to the corresponding future error prediction value and control input is minimized; and a second integrator that integrates the increment of the control input outputted by said operational unit and acquires the control input, and further wherein said operational unit calculates and outputs the increment of the control input, which is:

$$\Delta u(i) = \sum_{m=-K+1}^{M} v_m \Delta r(i+m) -$$

$$\sum_{n=0}^{Na-1} p_n \Delta y(i-K-n) + Ee(i-K) - \sum_{n=1}^{Nb+K-1} g_n \Delta u(i-n) -$$

$$\sum_{n=0}^{Nd+K-1} x_n \Delta FF_1(i-n) - \sum_{n=0}^{Nc+K-1} t_n \Delta FF_2(i-n) - Fu(i-1)$$

where $\Delta FF_1(x)$ and $\Delta FF_2(x)$ are increments of the two feedforward signals, $\Delta u(x)$ is an increment of the control input, $\Delta y(x)$ is the output increment, $\Delta r(x)$ is the command increment, $e(x)$ is the error, M, Na, Nb, Nc, and Nd are natural numbers, K is an integer of $K \geq 0$, vm, pn, E, gn, xn, tn and F are constants for the prediction control, and i is the present sampling time.

3. A prediction controlling device outputting a control input and feedforward signal to the controlled object, so that the output of the controlled object is reconciled with a target command, comprising:

a feedforward signal generation command filter that receives a target command signal which is information of the future target command as an input and outputs a future command increment which is an increment from one sampling period to the next sampling period of a target command signal from the present sampling time to a multiple-sampling future and the feedforward signal from the future target command signal;

and a prediction controller that receives the future command increment, the feedforward signal and a controlled object output at the past sampling time over zero sampling as inputs, acquires the future error prediction value by using a transfer function model from the feedforward signal and the control input to the controlled object output, determines the control input so that the performance function of the error prediction value and the control input becomes minimal, and applies the control input to the controlled object; and wherein said prediction controller includes:

a difference unit that receives the past controlled object output as an input and acquires increments of respective sampling periods of said corresponding controlled object output as the past output increments;

a memory section that stores constants for prediction control in advance, receives as inputs the command increment, two feedforward signals, output increment obtained by said difference means, and control input, and stores said past command increment, said past feedforward signals, said past output increment, and said past control input;

a subtracter that subtracts the past output increment from the past command increment, and acquires the past error increments;

an integrator that integrates the increment of the error, which is obtained by said subtracter and acquires said error; and an operational unit that receives as inputs the future command increment, past command increment, past feedforward signal, past output increment, past control input, constants for the prediction control, which are stored by the memory section, and the error acquired by the integrator, acquires a future error prediction value by using a discrete-time transfer function model from the feedforward signals and the control input to the controlled object output, which is $$Y(z) = \{(b_1 z^{-1} + \ldots + b_{Nb} z^{-Nb}) U(z) + (d_1 z^{-1} + \ldots + d_{Nd} z^{-Nd}) FF_1(z) + (c_1 z^{-1} + \ldots + c_{Nc} z^{-Nc}) FF_2(z)\} / \{(1-z^{-1})(1-a_1 z^{-1} - \ldots - a_{Na} z^{-Na})\}$$

where $FF_1(z)$ and $FF_2(z)$ are z-transform of the two feedforward signals, $U(z)$ is z-transform of the control input, $Y(z)$ is z-transform of the controlled object output, Na, Nb, Nc, and Nd are natural numbers, $a_1, a_2, \ldots, a_{Na}, b_1, b_2, \ldots, b_{Nb}, c_1, c_2, \ldots, c_{Nc}, d_1, d_2, \ldots, d_{Nd}$ are prescribed coefficients, and determines and outputs the control input so that the performance function with respect to the corresponding future error prediction value and control input is minimized, and further wherein said operational unit calculates and outputs said control input, which is:

$$u(i) = \sum_{m=-K+1}^{M} v_m \Delta r(i+m) - \sum_{n=0}^{Na-1} p_n \Delta y(i-K-n) + Ee(i-K) -$$

$$\sum_{n=1}^{Nb+K-1} g_n u(i-n) - \sum_{n=0}^{Nd+K-1} x_n FF_1(i-n) - \sum_{n=0}^{Nc+K-1} t_n FF_2(i-n)$$

where $FF_1(x)$ and $FF_2(x)$ are the two feedforward signals, $u(x)$ is the control input, $\Delta y(x)$ is the output increment, $\Delta r(x)$ is the command increment, $e(x)$ is the error, vm, pn, E, gn, xn, and tn are constants for the prediction control, and i is the present sampling time.

4. The prediction controlling device as set forth in any one of claims 1 through 3, wherein said feedforward signal generation command filter receives said target command signal at the present sampling time as an input, and outputs increments between respective sampling periods of said corresponding target command signals or signals obtained by filtering said target command signals as said future command increments.

5. The prediction controlling device as set forth in any one of claims 1 through 3, wherein said feedforward signal generation command filter calculates and outputs said feedforward signals, which are:

$$FF_1(i) = \text{Gain1} \cdot \Delta r(i+m1)$$

$$FF_2(i) = \text{Gain2} \cdot \{\Delta r(i+m2) - \Delta r(i+m2-1)\}$$

where i is the present sampling time, Gain1 and Gain2 are constants, m1 and m2 are integers of $0 \leq m1 \leq m2$, $\Delta r(i+m1)$ is said command increment of m1 sampling future, and $FF_1(i)$ and $FF_2(i)$ are said feedforward signals.

6. The prediction controlling device as set forth in any one of claims 1 through 3, wherein said controlled object includes a motor and its speed controller, said control input is a speed command, said controlled object output is a motor position, and said feedforward signals are a feedforward signal for speed control and a feedforward signal for torque control.

* * * * *

UNITED STATES PATENT AND TRADEMARK OFFICE
CERTIFICATE OF CORRECTION

PATENT NO. : 6,825,631 B1
APPLICATION NO. : 10/343954
DATED : November 30, 2004
INVENTOR(S) : Hiroshi Nakamura It is certified that error appears in the above-identified patent and that said Letters Patent is hereby corrected as shown below:

On the title page: Item [73], After "Kitakyushu" insert --shi--.

Figure 6:
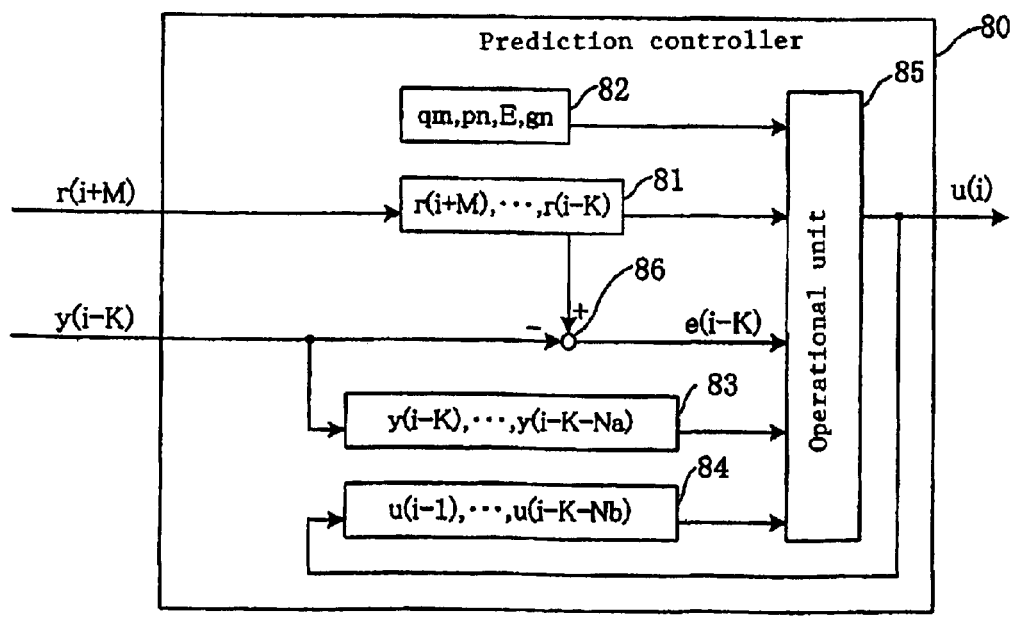
FIG. 6 is a block diagram showing a configuration of a prior art controlling device.

On the Sheet 4 of 5, At the bottom of figure 6 insert --Prior Art--.

Column 3/line 23-24, Delete

" $Y(z)=\{(b_1z^{-1}+\ldots+b_{Nb}z^{-Nb})U(z)+(d_1z^{-1}+\ldots+d_{Nd}z^{-Nd})FF_1(z)+ (c_1z^{-1}+\ldots+c_{Nc}z^{-Nc})FF_2(z)\}/(1-a_1z^{-1}31\ldots-a_{Na}z^{-Na})$, "

and insert

-- $Y(z)=\{(b_1z^{-1}+\cdots+b_{Nb}z^{-Nb})U(z)+(d_1z^{-1}+\cdots+d_{Nd}z^{-Nd})FF_1(z) +(c_1z^{-1}+\cdots+c_{Nc}z^{-Nc})FF_2(z)\}/(1-a_1z^{-1}-\cdots-a_{Na}z^{-Na})$, -- therefor.

Column 4/line 36-44, Delete

"
$$\Delta u(i) = \sum_{m=K+1}^{M} v_m \Delta r(i+m) - \sum_{n=0}^{Na-1} p_n \Delta y(i-K-n) + Ee(i-K) - \sum_{n=1}^{Nb+K-1} g_n \Delta u(i-n) - \sum_{n=0}^{Nd+K-1} x_n \Delta FF_1(i-n) - \sum_{n=0}^{Nc+K-1} t_n \Delta FF_2(i-n) - Fu(i-1)$$
"

UNITED STATES PATENT AND TRADEMARK OFFICE
CERTIFICATE OF CORRECTION

PATENT NO. : 6,825,631 B1
APPLICATION NO. : 10/343954
DATED : November 30, 2004
INVENTOR(S) : Hiroshi Nakamura It is certified that error appears in the above-identified patent and that said Letters Patent is hereby corrected as shown below:

and insert $$-- \Delta u(i) = \sum_{m=-K+1}^{M} v_m \Delta r(i+m) - \sum_{n=0}^{Na-1} p_n \Delta y(i-K-n) + Ee(i-K) - \sum_{n=1}^{Nb+K-1} g_n \Delta u(i-n)$$

$$- \sum_{n=0}^{Nd+K-1} x_n \Delta FF_1(i-n) - \sum_{n=0}^{Nc+K-1} t_n \Delta FF_2(i-n) - Fu(i-1) --$$

therefor.

Column 5/line 10-13, Delete

" $Y(z) = \{(b_1 z^{-1} + \ldots + b_{Nb} z^{-Nb}) U(z) + (d_1 z^{-1} + \ldots + d_{Nd} z^{-Nd}) FF_1(z) + (c_1 z^{-1} + \ldots + c_{Nc} z^{-Nc}) FF_2(z)\} / \{(1-z^{-1})(1 - a_1 z^{-1} - \ldots - a_{Na} z^{-Na})\}$ "

and insert $$-- Y(z) = \{(b_1 z^{-1} + \cdots + b_{Nb} z^{-Nb}) U(z) + (d_1 z^{-1} + \cdots + d_{Nd} z^{-Nd}) FF_1(z)$$

$$+ (c_1 z^{-1} + \cdots + c_{Nc} z^{-Nc}) FF_2(z)\} / \{(1-z^{-1})(1 - a_1 z^{-1} - \cdots - a_{Na} z^{-Na})\} --$$

therefor.

Column 9/line 34-35, Delete

" $Y(z) = \{(b_1 z^{-1} + \ldots + b_{Nb} z^{-Nb}) U(z) + (d_1 z^{-1} + \ldots + d_{Nd} z^{-Nd}) V_{FF}(z) + (c_1 z^{-1} + \ldots + + c_{Nc} z^{-Nc}) T_{FF}(z)\} / (1 - a_1 z^{-1} - \ldots - a_{Na} z^{-Na})$ "

and insert $$-- Y(z) = \{(b_1 z^{-1} + \cdots + b_{Nb} z^{-Nb}) U(z) + (d_1 z^{-1} + \cdots + d_{Nd} z^{-Nd}) V_{FF}(z)$$

$$+ (c_1 z^{-1} + \cdots + c_{Nc} z^{-Nc}) T_{FF}(z)\} / (1 - a_1 z^{-1} - \cdots - a_{Na} z^{-Na}) --$$

therefor.

UNITED STATES PATENT AND TRADEMARK OFFICE
CERTIFICATE OF CORRECTION

PATENT NO. : 6,825,631 B1  Page 3 of 6
APPLICATION NO. : 10/343954
DATED : November 30, 2004
INVENTOR(S) : Hiroshi Nakamura It is certified that error appears in the above-identified patent and that said Letters Patent is hereby corrected as shown below:

Column 10/line 34, Delete "$\hat{b}_{m0} = \sum_{j=1}^{m+K-1} a_j \cdot \hat{b}_{(m-j)0} + \sum_{j=1}^{m} b_j$" and insert -- $\hat{b}_{m0} = \sum_{j=1}^{m+K-1} a_j \cdot \hat{b}_{(m-j)0} + \sum_{j=1}^{m} b_j$ --, therefor.

Column 10/line 39, Delete "$\hat{b}_{mn} = \sum_{j=1}^{m+K-1} a_j \cdot \hat{b}_{(m-j)n} + b_{n+m}$" and insert -- $\hat{b}_{mn} = \sum_{j=1}^{m+K-1} a_j \cdot \hat{b}_{(m-j)n} + b_{n+m}$ --, therefor.

Column 10/line 46, Delete "$\hat{d}_{m0} = \sum_{j=1}^{m+K-1} a_j \cdot \hat{d}_{(m-j)0} + \sum_{j=1}^{m} d_j$" and insert -- $\hat{d}_{m0} = \sum_{j=1}^{m+K-1} a_j \cdot \hat{d}_{(m-j)0} + \sum_{j=1}^{m} d_j$ --, therefor.

Column 10/line 51, Delete "$\hat{d}_{mn} = \sum_{j=1}^{m+K-1} a_j \cdot \hat{d}_{(m-j)n} + d_{n+m}$" and insert -- $\hat{d}_{mn} = \sum_{j=1}^{m+K-1} a_j \cdot \hat{d}_{(m-j)n} + d_{n+m}$ --, therefor.

UNITED STATES PATENT AND TRADEMARK OFFICE
CERTIFICATE OF CORRECTION

PATENT NO. : 6,825,631 B1
APPLICATION NO. : 10/343954
DATED : November 30, 2004
INVENTOR(S) : Hiroshi Nakamura It is certified that error appears in the above-identified patent and that said Letters Patent is hereby corrected as shown below:

Column 10/line 59, Delete " $\hat{c}_{m0} = \sum_{j=1}^{m+K-1} a_j \cdot \hat{c}_{(m-j)0} + \sum_{j=1}^{m} c_j$ " and insert -- $\hat{c}_{m0} = \sum_{j=1}^{m+K-1} a_j \cdot \hat{c}_{(m-j)0} + \sum_{j=1}^{m} c_j$ --, therefor.

Column 10/line 64, Delete " $\hat{c}_{mn} = \sum_{j=1}^{m+K-1} a_j \cdot \hat{c}_{(m-j)n} + c_{n+m}$ " and insert -- $\hat{c}_{mn} = \sum_{j=1}^{m+K-1} a_j \cdot \hat{c}_{(m-j)n} + c_{n+m}$ --, therefor.

Column 11/line 2, Delete "$c_n0$" and insert --$c_n=0$--, therefore.

Column 11/line 28, Delete " $A_{mn} = \hat{a}_{mn} \cdot a_{n-K}$ " and insert -- $A_{mn} = \hat{a}_{mn} \cdot a_{n-K}$ --, therefor.

Column 11/line 30, Delete " $B_{mn} = \hat{b}_{mn} \cdot b_{n-K}$ " and insert -- $B_{mn} = \hat{b}_{mn} \cdot b_{n-K}$ --, therefor.

Column 11/line 32, Delete " $D_{mn} = \hat{d}_{mn} \cdot d_{n-K}$ " and insert -- $D_{mn} = \hat{d}_{mn} \cdot d_{n-K}$ --, therefor.

UNITED STATES PATENT AND TRADEMARK OFFICE
CERTIFICATE OF CORRECTION

PATENT NO. : 6,825,631 B1
APPLICATION NO. : 10/343954
DATED : November 30, 2004
INVENTOR(S) : Hiroshi Nakamura It is certified that error appears in the above-identified patent and that said Letters Patent is hereby corrected as shown below:

Column 11/line 34, Delete " $C_{mn} = \hat{c}_{mn} \cdot c_{n \cdot K}$ " and insert -- $C_{mn} = \hat{c}_{mn} \cdot c_{n \cdot K}$ --, therefor.

Column 12/line 5, Delete " $g_1 = \sum_{m=1}^{M} q_m B_{m1} \cdot c_d / W,$ " and insert -- $g_1 = \sum_{m=1}^{M} q_m B_{m1} \cdot c_d / W,$ --, therefor.

Column 13/line 60, Delete " $\beta_s = \sum_{j=1}^{g} B_{j0}, \quad W = \sum_{s=1}^{M} w_g \beta_s^2 + c_a + c_d,$ " and insert -- $\beta_s = \sum_{j=1}^{s} B_{j0}, \quad W = \sum_{s=1}^{M} w_s \beta_s^2 + c_a + c_d,$ --, therefor.

UNITED STATES PATENT AND TRADEMARK OFFICE
CERTIFICATE OF CORRECTION

PATENT NO. : 6,825,631 B1
APPLICATION NO. : 10/343954
DATED : November 30, 2004
INVENTOR(S) : Hiroshi Nakamura It is certified that error appears in the above-identified patent and that said Letters Patent is hereby corrected as shown below:

Column 16/line 5, Delete " $\beta_s \sum_{j=1}^{S} B_{j0}, W = \sum_{s=1}^{M} w_s \beta_s^2 + c_s + c_d,$ " and insert -- $\beta_s = \sum_{j=1}^{S} B_{j0}, \quad W = \sum_{s=1}^{M} w_s \beta_s^2 + c_a + c_d,$ --, therefor.

Column 19/ line 19, In Claim 2, delete "Fare" and insert --F are--, therefor.

Signed and Sealed this

Thirty-first Day of October, 2006

JON W. DUDAS
*Director of the United States Patent and Trademark Office*